United States Patent [19]

Wallrafen

[11] Patent Number: 5,140,234
[45] Date of Patent: Aug. 18, 1992

[54] WINDSHIELD WIPER CONTROL BASED ON RATE OF CHANGE OF SENSOR SIGNAL

[75] Inventor: Werner Wallrafen, Sulzbach, Fed. Rep. of Germany

[73] Assignee: VDO Adolf Schindling AG, Frankfurt am Main, Fed. Rep. of Germany

[21] Appl. No.: 621,366

[22] Filed: Nov. 30, 1990

[30] Foreign Application Priority Data

Jan. 12, 1990 [DE] Fed. Rep. of Germany ....... 4000735

[51] Int. Cl.$^5$ .............................................. B60S 1/00
[52] U.S. Cl. .................................. 318/264; 318/444; 318/483; 318/DIG. 2; 15/250.13; 15/DIG. 15
[58] Field of Search ........ 318/264, 268, 272, 280–286, 318/54, 55, 59, 62, 65, 616, 618, 443, 444, 449, 450, 452, 453, 456–459, 461, 463, 483, DIG. 2; 15/250 C, 250.12, 250.13, 250.17; 307/10.1

[56] References Cited

U.S. PATENT DOCUMENTS

| Re. 33,308 | 8/1990 | Millerd et al. | 318/444 |
| 3,604,997 | 9/1971 | Kirchner et al. | 318/443 |
| 3,786,330 | 1/1974 | Inoue et al. | 318/483 |
| 4,131,834 | 12/1978 | Blaszkowski | 318/483 |
| 4,527,105 | 7/1985 | Shiraishi | 318/444 |
| 4,554,493 | 11/1985 | Armstrong | 318/444 |
| 4,567,412 | 1/1986 | Graham | 318/483 |
| 4,703,237 | 10/1987 | Hochstein . | |
| 4,705,998 | 11/1987 | Millerd et al. . | |
| 4,740,735 | 4/1988 | Hayashi . | |
| 4,916,374 | 4/1990 | Schierbeek et al. | 318/483 |
| 4,942,349 | 7/1990 | Millerd et al. | 318/483 |
| 4,987,354 | 1/1991 | Steinmann | 318/444 |

FOREIGN PATENT DOCUMENTS

| 0136984 | 4/1985 | European Pat. Off. . |
| 2630470 | 1/1978 | Fed. Rep. of Germany . |
| 8302093 | 6/1983 | World Int. Prop. O. . |
| 8900119 | 1/1989 | World Int. Prop. O. . |

Primary Examiner—A. Jonathan Wysocki
Attorney, Agent, or Firm—Martin A. Farber

[57] ABSTRACT

A method for controlling a windshield wiper, particularly on a motor vehicle, in which a rain sensor is located on the windshield to be wiped in the region of the windshield wiper and gives off a sensor signal as a function of the amount of wetness. The rate of change of the sensor signal after the windshield wiper has passed the sensor is determined and used in order to control the frequency of wiping.

5 Claims, 3 Drawing Sheets

WINDSHIELD WIPER CONTROL BASED ON RATE OF CHANGE OF SENSOR SIGNAL

FIELD AND BACKGROUND OF THE INVENTION

The present invention relates to a method and a system for controlling a windshield wiper, particularly on a motor vehicle, in which a rain sensor located on the windshield to be wiped in the region of the windshield wiper gives off a sensor signal as a function of the amount of water.

Devices for controlling windshield wipers are known in which the windshield-wiper motor automatically starts when a predetermined amount of water is present on the windshield. For optimal viewing, however, it is important to adapt the operation of the windshield wiper to the instantaneous intensity of the rain, which can be effected by connection and disconnection, changing the intervals between individual wipings, changing the speed and/or switching between intermittent operation (single wipe) and continuous operation (continuous wiping).

SUMMARY OF THE INVENTION

It is an object of the present invention to make automatic adaptation to the intensity of the rain possible in dependable manner.

According to the method of the invention, the rate of change of the sensor signal, after the windshield wiper has passed the sensor, is determined and is used to control the frequency of wiping of the windshield wiper. The invention makes it possible to obtain a dependable measure of the intensity of the rain.

An advantageous further development of the method of the invention provides that with a rate of change above a predetermined threshold, continuous operation of the windshield wiper is brought about and that with a rate of change below the predetermined threshold, switching to intermittent operation is effected.

One advantage of this further development is that the criteria for switching between continuous wiping and single wiping can be monitored continuously by simple means. This is true both during continuous operation, upon which, in case of the abating of the rain, switching is to be effected to intermittent operation, and during intermittent operation with respect to switching to continuous operation if the rain becomes stronger.

Another aspect of the method of the invention provides that a high rate of change of the sensor signal with a sign which indicates a sudden reduction of water is interpreted as passage of the windshield wiper and that, after a predetermined period of time, a time window for the evaluation of the rate of change is activated.

By this further aspect a fixing of the time for the evaluation of the rate of change is possible also in the case of continuous operation, namely when otherwise no signal is present in order to recognize the position of the windshield wiper at the time.

A feature of the invention provides that, after a fixed predetermined period of time after a wiper-connect signal, the rate of change of the sensor signal is evaluated. In this way, an establishing of the time for the evaluation of the rate of change upon intermittent operation is advantageously possible.

In order to prevent excessively frequent switching between intermittent and continuous operation in the case of intense rain within the border region, it is provided, in accordance with a further development, that the threshold for the switching from continuous operation to intermittent operation is lower than that from intermittent operation to continuous operation.

The starting of the windshield-wiper motor in the case of intermittent operation can be effected by various methods. A further aspect of the invention provides that, after a setting to intermittent operation caused by a rate of change which is less than a predetermined threshold, the windshield-wiper motor is started when the sensor signal reaches a second predetermined threshold value.

In accordance with a further feature of the invention, the rate of change of the sensor signal can also be used to control the length of the interval between individual wipings or to control the speed of the windshield wiper.

Further according to the invention, an arrangement is provided for carrying out the method in which the sensor is connected to a microcomputer (5) by an analog/digital converter (4), and a program in accordance with the method of the invention is provided for the microcomputer (5).

Still further according to a feature of the invention, the sensor is a capacitive wetness sensor (13, 14).

BRIEF DESCRIPTION OF THE DRAWINGS

With the above and other advantages in view, the present invention will become more clearly understood in connection with the detailed description of a preferred embodiment when considered with the accompanying drawing, of which.

DETAILED DESCRIPTION OF THE PREFERRED EMBODIMENT

Figure 1:
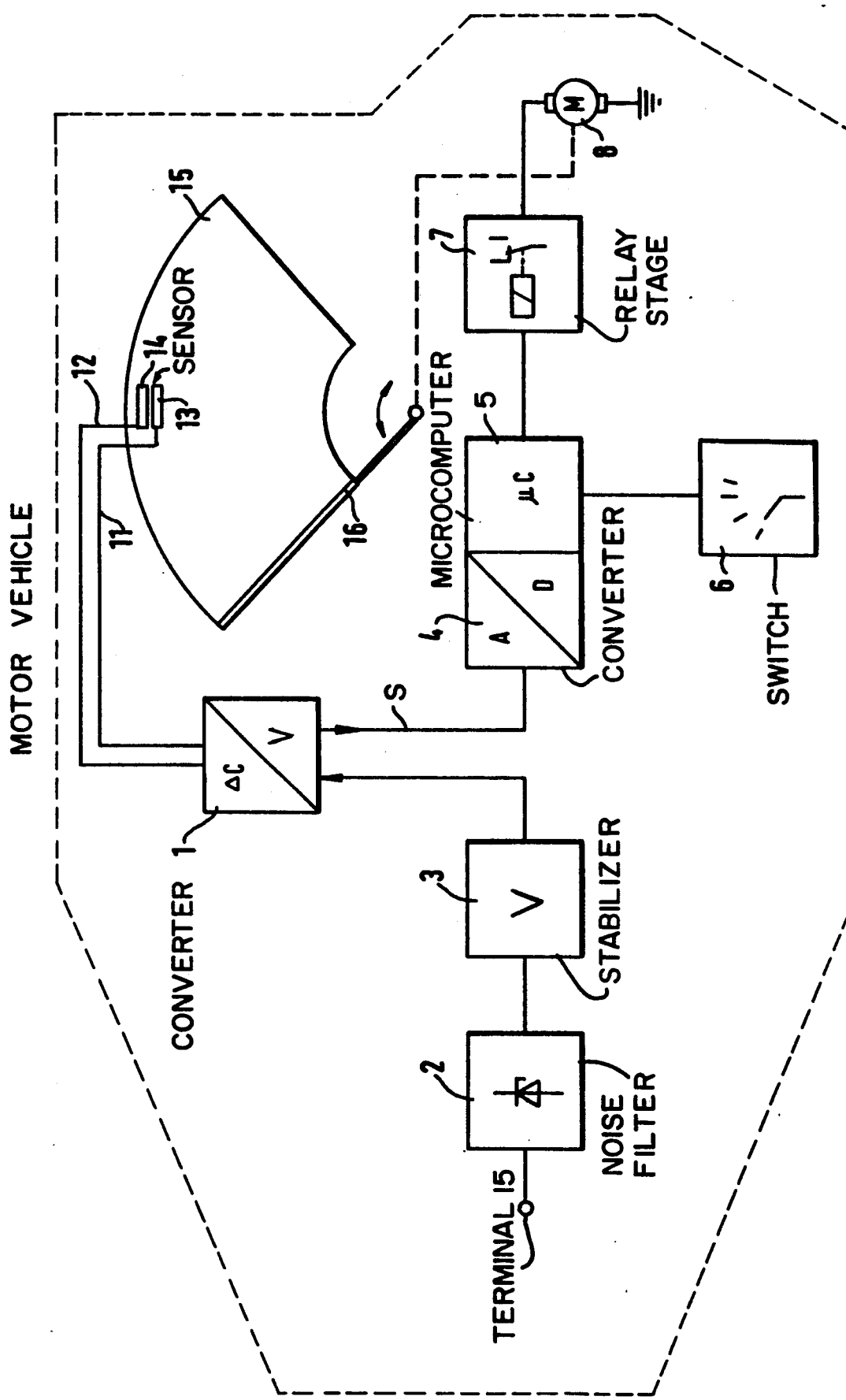
FIG. 1 is a block-circuit diagram of a system for carrying out the method of the invention.

In the device shown in FIG. 1, the degree of the wetting of the windshield is determined by means of a capacitive sensor consisting essentially of capacitor plates 13, 14 which are connected by wires 11, 12 to a circuit 1 which, in known manner, converts a change in capacitance caused by a wetting of the windshield into an electric signal. The circuit 1 is fed operating voltage via a terminal 15 of the car electric system, via a noise-voltage filter 2 and via a stabilizing circuit 3. The output voltage of the circuit 1—hereinafter referred to a sensor signal S—is fed to an analog/digital convertor 4 of a so-called single-chip microcomputer 5.

The microcomputer 5 is connected to an operating switch 6 which is preferably developed as a steering column switch and has detent positions for continuous operation and automatic operation, as well as a touch position for a single wiping. The motor 8 is connected to an output of the microcomputer by a relay stage 7. The windshield-wiper motor 8 is connected in known manner by a drive (not shown) to a wiper arm 16 which passes over the windshield region 15 to be wiped.

Figure 2:
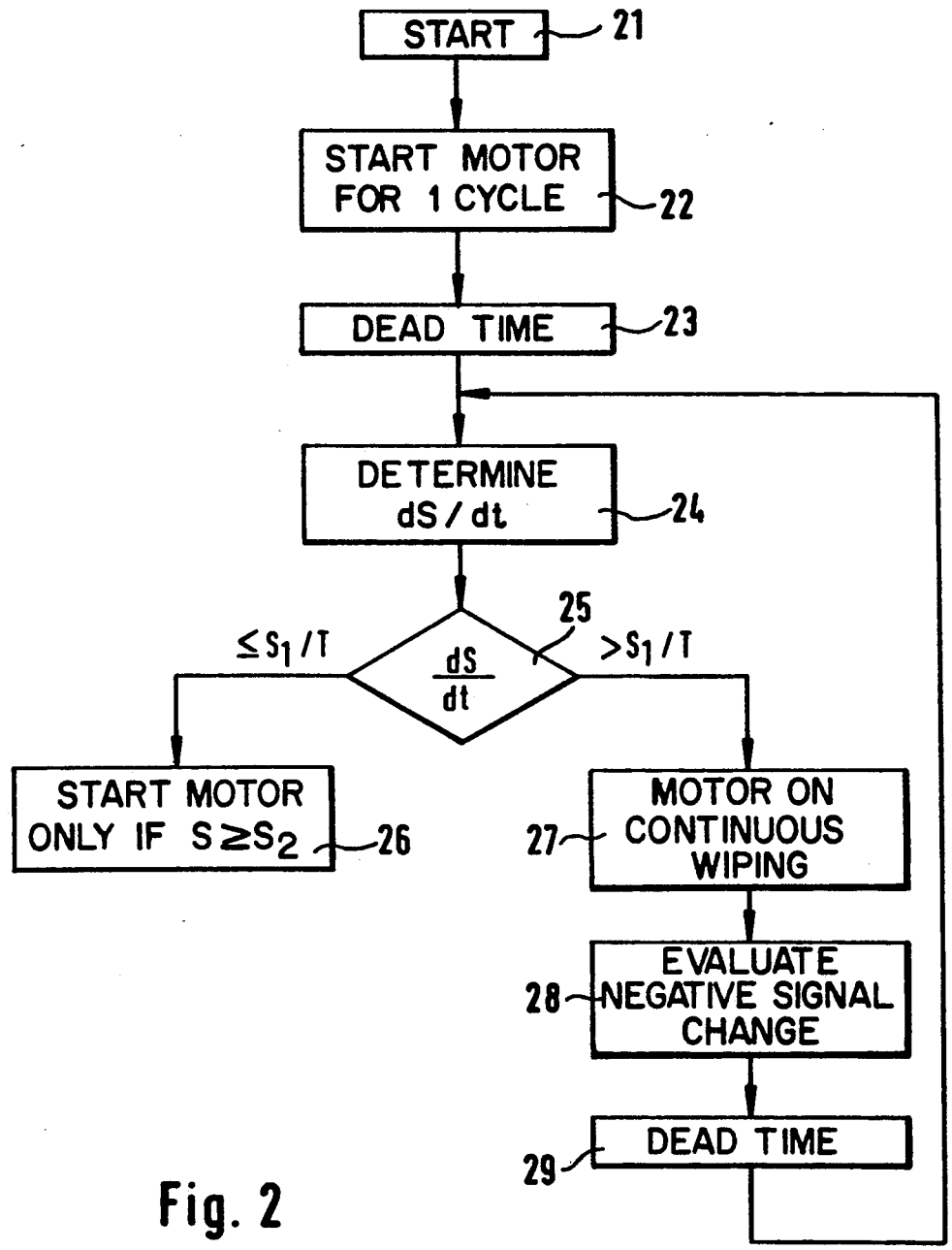
FIG. 2 is a flowchart of a program intended for a microcomputer in the system according to FIG. 1.

In the program shown in FIG. 2, after start at 21, in the program part 22 the windshield-wiper motor 8 (FIG. 1) is activated for one cycle. After the passage of a dead time $t_1$ in the program part 23, the rate of change $ds/dt$ of the sensor signal S is determined at 24. This is effected in known manner whereby a value of the sensor signal is called for in each case at successive times, and the difference between the values is formed. If the difference in time between the inquiries is constant, the division by dt can be omitted. At the following branching 25 it is tested whether the rate of change ds/dt is less than or greater than a predetermined threshold $S_1/T$. If the rate of change is not greater than the threshold, then a program is activated at 26 which starts the windshield-wiper motor only when the intensity of the rain has a reached a predetermined threshold value. This can take place, for instance, when the sensor signal S exceeds a suitable threshold value $S_2$.

However, if the rate of change at the branching 25 is greater than the predetermined threshold, the windshield-wiper motor is switched at 27 to continuous wiping. During this manner of operation it is continuously checked in the following program part 28 whether the sensor signal has a large negative rate of change. This will be the case when the windshield wiper passes over the sensor (13, 14, FIG. 1). At this time determined by the program part 28, another dead time $t_2$ is started at 29, after the expiration of which the determination of the rate change of the sensor signal is carried out again in the program part 24.

Figure 3A:
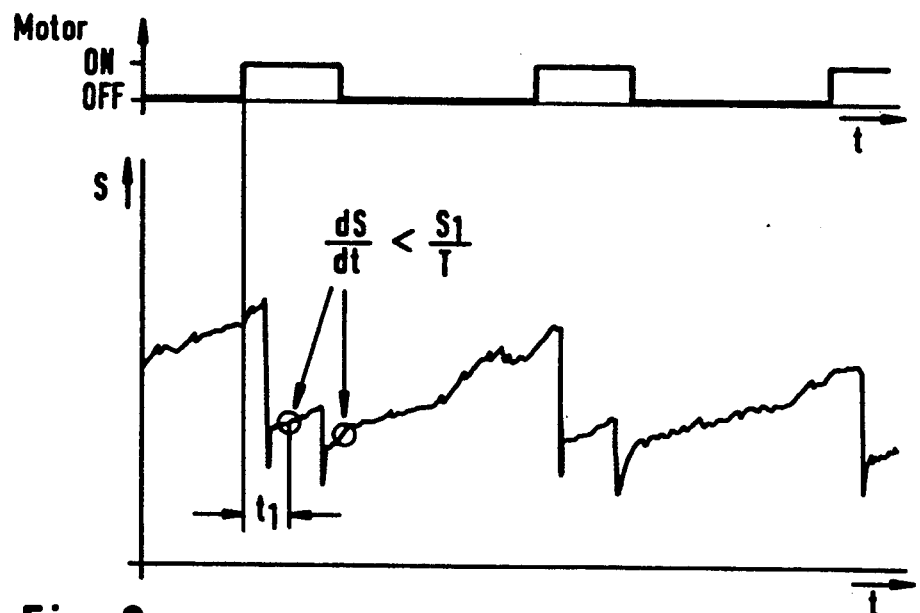
FIGS. 3a and 3b show examples of time relationships of the sensor signal and the voltage on the windshield-wiper motor for single wiping and continuous wiping.

FIG. 3a shows the variation with time of the sensor signal S upon light rain and the state of connection of the windshield wiper upon single wiping. Whenever the windshield wiper passes the sensor, a negative change in signal results due to the water-removing action of the windshield wiper. By the arrangement of the sensor in the region of the wiping field 15 (FIG. 1), two such sudden changes in signal take place a short time after each other. After the dead time $t_1$, the change rate of the sensor signal S is determined. If the rate of change is slight—as in the case of FIG. 3a—the single wiping continues. The windshield-wiper motor is then started whenever the sensor signal S exceeds a predetermined threshold value (for example, $S_2$). After a wiping the motor is automatically stopped as in traditional windshield wiper systems.

Figure 3B:
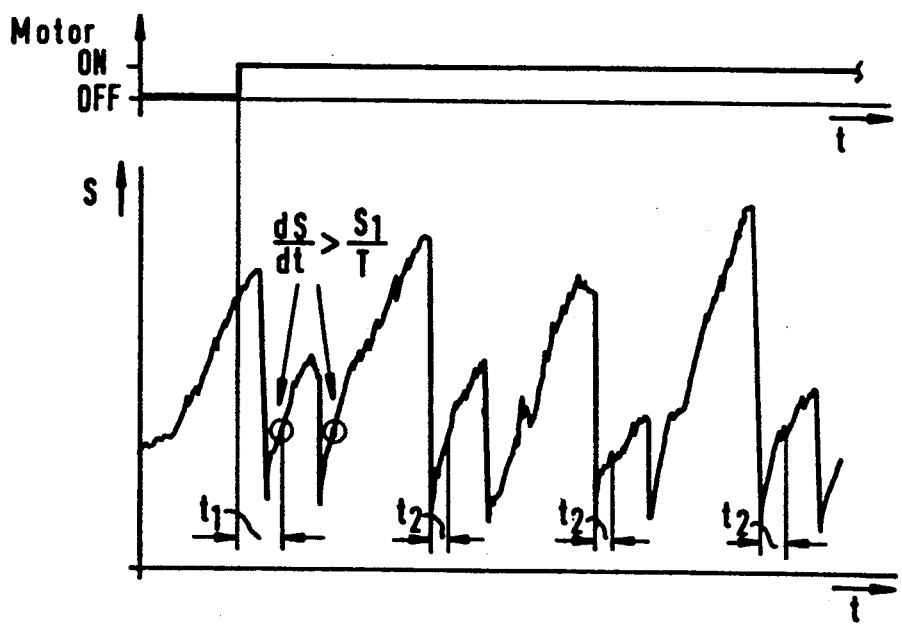

With the continuous wiping shown in FIG. 3b, a large rate of change of the sensor signal S is determined after the connecting of the windshield-wiper motor, whereupon continuous wiping is connected. However, during the continuous wiping a checking of the rate of change is effected continuously delayed by the period of time $t_2$ after the high negative changes in signal, as indicated by circles in the figures.

I claim:

1. A method for controlling a windshield wiper suitable for a motor vehicle, wherein a rain sensor is disposed on a windshield to be wiped, the sensor being located in the region swept by the windshield wiper, the sensor giving off a sensor signal as a function of the amount of water in contact with the sensor, the method comprising the steps of determining a rate of change of the sensor signal after the windshield wiper has passed the sensor;

using the rate to control the frequency of wiping of the windshield wiper;

with a rate of change in the sensor signal above a predetermined threshold, initiating continuous operation of the windshield wiper; and with a rate of change in the sensor signal below the predetermined threshold, switching the wiper to intermittent operation;

interpreting a high rate of change of the sensor signal with a sign which indicates a sudden reduction of water to indicate a passage of the windshield wiper; and activating, after a predetermined period of time, a time interval for the evaluation of the rate of change.

2. A method for controlling a windshield wiper suitable for a motor vehicle, wherein a rain sensor is disposed on a windshield to be wiped, the sensor being located in the region swept by the windshield wiper, the sensor giving off a sensor signal as a function of the amount of water in contact with the sensor, the method comprising the steps of determining a rate of change of the sensor signal after the windshield wiper has passed the sensor;

using the rate to control the frequency of wiping of the windshield wiper;

with a rate of change in the sensor signal above a predetermined threshold, initiating continuous operation of the windshield wiper; and with a rate of change in the sensor signal below the predetermined threshold, switching the wiper to intermittent operation; and wherein in said determining step, after a fixed predetermined period of time after a wiper-connect signal, evaluating the rate of change of the sensor signal.

3. A method according to claim 1, wherein after a setting to intermittent operation caused by a rate of change which is less than a predetermined threshold, starting the windshield-wiper motor upon attainment by the sensor signal of a second predetermined threshold value.

4. A method according to claim 1, wherein the sensor is connected to a microcomputer by an analog/digital converter, the method further comprising operating the microcomputer with a program for forming a difference between values of the sensor signal before and after passage of the wiper.

5. A method according to claim 4, further comprising operating the sensor as a capacitive wetness sensor.

* * * * *